HIGH DENSITY, ERASABLE OPTICAL IMAGE RECORDER

Filed Jan. 24, 1961

INVENTORS
ALEX W. DREYFOOS, JR.
ROBERT V. MAZZA
WILLIAM A. RADKE
ALAN A. STALEY
BY Sughrue, Rothwell, Mion & Zinn
ATTORNEYS United States Patent Office 3,055,006

Patented Sept. 18, 1962

3,055,006
HIGH DENSITY, ERASABLE OPTICAL IMAGE RECORDER

Alex W. Dreyfoos, Jr., Port Chester, Robert V. Mazza, Poughkeepsie, William A. Radke, Mount Kisco, and Alan A. Staley, Ossining, N.Y., assignors to International Business Machines Corporation, New York, N.Y., a corporation of New York Filed Jan. 24, 1961, Ser. No. 84,570
12 Claims. (Cl. 346—74)

This invention relates to a recording system and more particularly to such a system employing an optical storage device which is capable of storing image forms or digital data as electrostatic charge patterns thereon and to the method of said information.

For illustration purposes only, recording of digital data is shown herein. However, the invention also contemplates image recording for the recording of graphic or pictorial data. It is desirable in recording digital data that the system be both versatile and have a large storage capacity. The present invention provides both of these features by combining the processing speeds associated with magnetic storage with the high storage capacity associated with photographic technique. The recording of said data is achieved by modulating a charge pattern on a storage device constructed in accordance with this invention with a light beam and converting this modulated charge pattern into a pattern of ripples on the surface of a deformable material included as an integral part of said storage device. The storage device of this invention is composed of two thin layers, in some cases permanently bonded together and in others only temporarily bonded together, of dielectric material in the form of a sandwich element. The first layer is a transparent dielectric material of substantial uniform thickness. The second layer is a thin photoconductive material also functioning as a dielectric. The first layer may be a transparent thermoplastic material. By some means, such as Corona discharge, a uniform charge pattern is placed, while in the dark, either on the outer surface of the thermoplastic layer or on the inner surface of the photoconductive layer. The modulated light beam modulates this charge pattern. A recharge cycle is performed to set up a difference in electrostatic forces between the dark areas and the light areas of the thermoplastic layer. The sandwich element is then heated to the melting point of the thermoplastic material to form a ripple pattern characterized by depressed areas corresponding to those areas of higher electrostatic force and ridges corresponding to those areas of lower electrostatic force. In some cases wherein the bond is only temporary the two layers forming the sandwich element are separated. The thermoplastic layer is heated to produce the ripple pattern. The photoconductive layer passes to an erase station where its residual charge pattern is discharged. Upon cooling, this ripple pattern in the thermoplastic layer becomes rigid. Reading of the ripple pattern can be obtained by an optical system such as the Schlieren system. Erasure of the thermoplastic layer is accomplished by reheating above the melting point of the thermoplastic material to again smooth out the surface of the thermoplastic layer and discharge the remaining charges.

It is therefore one object of this invention to provide a high capacity versatile storage device and system for recording thereon.

It is a further object of this invention to provide a method of recording on said device.

It is another object of this invention to provide method and apparatus for recording which involves modulation of a charge pattern on such a storage device and converting this modulated charge pattern into a ripple pattern indicative of the stored data.

It is a further object of this invention to provide a method and apparatus by which such a ripple pattern is stored and then may be erased.

Another object of the invention is to achieve said recording by a light source to store either digital data or image forms.

It is a further object of the invention to provide a system for recording digital data or image forms on a storage device wherein said data or forms appear as a ripple pattern on a thin film sandwich element comprised of a layer of transparent thermoplastic material permanently bonded to a layer of photoconductive material.

These and other objects will become apparent from a more detailed description of the accompanying drawings.

Figure 1:
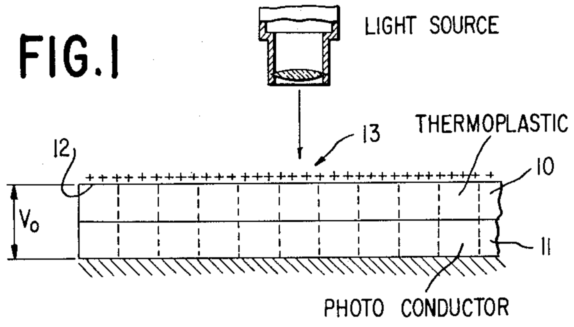
FIGURE 1 is a diagrammatic representation of a storage device constructed in accordance with the present invention and also showing a light source for modulating the substantially uniform charge pattern established on said storage device.

Referring first to FIGURE 1, the sandwich element is composed of a transparent dielectric material 10 of substantially uniform thickness which will hold a charge preferably of a thermoplastic dielectric material deformable by heat, bonded to a photoconductive dielectric material 11 having a relatively high dark resistance and a relatively low light resistance. It can be assumed that the bottom of the layer 11 is at some constant potential such as ground. In accordance with that will be called Scheme A, the sandwich is formed and then by any conventional means such as Corona discharge, a substantially uniform charge pattern is placed on the surface 12 of the layer 10. In this case positive ions are shown for illustration purposes, although of course negative ions may be used. The charge is applied in the dark with the resistance of layer 11 at a relatively high value. If it is considered that the charge applied is sufficient to establish a voltage drop across the sandwich element equal to $V_0$, then the following formulae obtain:

$$V_{TP}=+V_0\frac{C_{TP}}{C_{TP}+C_{PC}} \quad (1)$$

$$V_{PC}=+V_0\frac{C_{PC}}{C_{TP}+C_{PC}} \quad (2)$$

In the above formulae, $V_{TP}$ equals the voltage across the thermoplastic layer 10, $V_{PC}$ equals the voltage across the photoconductive layer 11, $C_{TP}$ equals the capacitance of the layer 10, and $C_{PC}$ the capacitance of the layer 11.

Figure 2A:
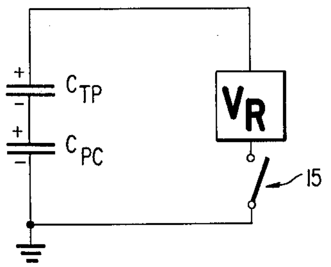
FIGURES 2A and 2B are diagrammatic representations of equivalent circuitry used for the explanation of the present invention.
Figure 2B:
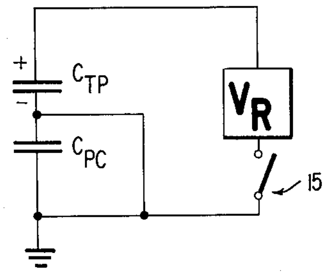

If it now is considered that a light beam from any conventional light source is directed onto a discrete data area, say area 13, of the sandwich element, said light passes through the transparent layer 10 and lowers the resistance of the photoconductive layer 11 to substantially zero. The other areas, not illuminated by this light beam, remain unaffected. In FIGURES 2A and 2B there are shown equivalent circuits using condensers as elements equivalent to $C_{PC}$ and $C_{TP}$. As to the dark areas, FIGURE 2A shows no change in charge pattern. Therefore for said areas the Formulae 1 and 2 hold. But for the light area 13, there is a transfer of charge due to leakage afforded by the short circuit in the photoconductive portion of area 13. Therefore, while for area 13 Formula 1 still holds, now $V_{PC}$ equals zero. In FIGURE 2A, when switch 15 is closed providing the application of a recharge voltage $V_R$, the charge distribution is determined by the following formulae:

(3) $$Q_{TP}=V_{TP}C_{TP}$$
(4) $$Q_{PC}=V_{PC}C_{PC}$$

For the light area 13 upon the application of $V_R$, the situation is as illustrated in FIGURE 2B and the following formulae obtain:

(5) $$Q_{TP}=V_{TP}C_{PT}$$
(6) $$Q_{PC}=0$$

When switch 15 is closed, the following formulae obtain:

(7) $$Q'_{TP}=Q_{TP}+q$$
(8) $$Q'_{PC}=Q_{PC}+q$$

The $q$ in the above formulae represents the transferred charge. The final voltage equations are as follows:

(9) $$V'_{TP}+V'_{PC}+V_R=0$$

where:

(10) $$V'_{TP}=V_{TP}+\frac{q}{C_{TP}}$$

(11) $$V'_{PC}=V_{PC}+\frac{q}{C_{PC}}$$

Substituting in Formula 9, we have:

(12) $$V_{TP}+\frac{q}{C_{TP}}+V_{PC}+\frac{q}{C_{PC}}+V_R=0$$

(13) $$q=-(V_{TP}+V_{PC}+V_R)\frac{C_{TP}C_{PC}}{C_{TP}+C_{PC}}$$

Assuming now that $C_{TP}=C_{PC}$ and therefore $V_{TP}=V_{PC}=V_{0/2}$ and $V_R=0$ volts, then for the dark areas:

(14) $$q=-V_{0/2}C_{TP}=-V_{0/2}C_{CP}$$
(15) $$Q'_{TP}=V_{TP}C_{TP}-V_{0/2}C_{TP}$$
(16) $$Q'_{TP}=V_{0/2}C_{TP}-V_{0/2}C_{TP}$$
(17) $$Q'_{TP}=0$$

And similarly:

(18) $$Q'_{PC}=0$$
(19) $$V'_{TP}=0$$
(20) $$V'_{PC}=0$$

For the light area 13, the following is true:

(21) $$q=-\tfrac{1}{2}(V_{0/2})C_{TP}=-\tfrac{1}{2}(V_{0/2})C_{PC}=-\tfrac{1}{4}V_0C_{PC}$$
(22) $$Q'_{TP}=-V_{0/4}C_{TP}$$
(23) $$Q'_{PC}=-V_{0/4}C_{PC}$$
(24) $$V'_{TP}=\tfrac{1}{4}V_0$$
(25) $$V'_{PC}=\tfrac{1}{4}V_0$$

Therefore it can be seen that the voltage across the thermoplastic layer in the light area 13 is greater than that across any dark area of the thermoplastic layer. Since the forces set up in the layer are proportionate to the voltage thereacross and of course its thickness, assumed here to be uniform, there is more force across the light area 13 than on the remaining dark areas of the thermoplastic material. The sandwich is then heated, in the dark, to the melting point of the thermoplastic material. The electrostatic forces set up by the previous treatment depress those areas having the high electrostatic forces therein. In the case now under consideration, these depressions will be associated with the light areas and particularly in this instance the light area 13. The extent of depressions is determined by the magnitude of the electrostatic forces and the surface tension restoring force of the thermoplastic material. Viscosity of the thermoplastic layer at deformation is important. In general, it is desirable to have as low viscosity at deformation as possible.

Figure 3:
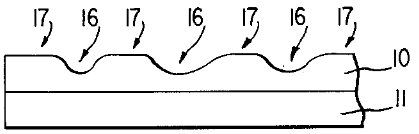
FIGURE 3 is a diagrammatic representation of the storage device of FIGURE 1 showing the ripple pattern impressed in the thermoplastic layer thereof as a result of the instant recording system.

After the depressions are formed, the sandwich is chilled and the ripple pattern becomes rigid as shown in FIGURE 3 where numeral 16 indicates the data areas which have been illuminated in a manner previously described. Erasure of the data can be obtained by reheating the sandwich above the melting point of the thermoplastic material to a point where it offers a low resistance and the charge pattern leaks off. The smooth surface of the thermoplastic material is thereby recaptured.

Thus far we have seen that when $V_R=0$ volts, the light area will have a higher electrostatic force set up therein than the dark areas. However, by similar calculation it can be shown that if $V_R=-V_{0/2}$ and $C_{TP}=C_{PC}$ then:

(26) $$V'_{TP}\ \text{(dark areas)}=-V_{0/4}$$
(27) $$V'_{PC}\ \text{(dark areas)}=-V_{0/4}$$
(28) $$V'_{TP}\ \text{(light areas)}=0$$
(29) $$V'_{PC}\ \text{(light areas)}=-V_{0/2}$$

In this case, after heating, the depressed areas 16 are the dark areas and the areas 17 are the light areas as shown in FIGURE 3.

Where the $V_R=+V_{0/2}$ volts and $C_{TP}=C_{PC}$, for the dark areas:

(30) $$V'_{TP}=V_{0/4}$$
(31) $$V'_{PC}=V_{0/4}$$

For the light areas:

(32) $$V'_{TP}=V_{0/2}$$
(33) $$V'_{PC}=0$$

So that under these circumstances the light areas form the depressions.

Figure 4:
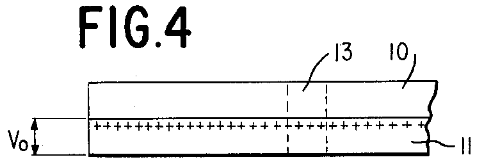
FIGURE 4 is a view similar to FIGURE 1 showing another embodiment of the invention.

In accordance with Scheme B, the photoconductive layer 11 is charged to a voltage of $+V_0$ in the dark and then the thermoplastic layer is bonded thereto. Such a storage element is shown in FIGURE 4. In this case:

(34) $$V_{TP}=0$$
(35) $$V_{PC}=+V_0$$

Assuming first that $V_R=+V_0$, then in the dark areas:

(36) $$V'_{TP}=0$$
(37) $$V'_{PC}=V_0$$

And in the light areas:

(38) $$V'_{TP}=V_{0/2}$$
(39) $$V'_{PC}=V_{0/2}$$

The depressions correspond in this instance to the light areas.

If in Scheme B, $V_R=-V_0$, then for the dark areas:

(40) $$V'_{TP}=-V_0$$
(41) $$V'_{PC}=0$$

And for the light areas:

(42) $$V'_{TP}=-V_{0/2}$$
(43) $$V'_{PC}=-V_{0/2}$$

The depressions in this instance correspond to the dark areas.

Similarly with the Scheme B, if $V_R=0$, then the light areas are depressed.

In accordance with Scheme C, there is a simultaneous application of the light beam for recording and the recharge technique. This is useful where the photoconductive layer switches from a dark resistance to a light resistance at a high speed and in those cases where the dark decay of the photoconductive layer is too fast to use Schemes A and B. A sandwich constructed as in either Schemes A or B can be employed with corresponding results with the various values of $V_R$.

The thermoplastic material that may be employed in accordance with this invention should have a substantially constant resistivity with temperature or at least should increase with temperature, preferably to a point where the temperature exceeds the melting point. At a temperature above the melting point, which may be called the erasure temperature, that is, when the depressions are eliminated, the resistivity should decrease so as to assist in the discharging of the sandwich upon erasure. This layer should be thin, in the order of milli inches and be of substantially uniform thickness. The viscosity should decrease with temperature as should the surface tension. Of course it should be able to hold the charge and create the depressions at the melting point due to the electrostatic forces set up therein as previously described. Examples are polystyrene and polyethylene.

The photoconductive material may be any conventional photoconductive material such as a selenium photoinsulator having a relatively high dark resistance. High dark resistance is preferred but materials having a somewhat lower dark resistance may be employed if the decay of the charge pattern and the permanency of the stored data is not too critical.

The means of reading the data stored on the sandwich element does not form a part of this invention. However, an optical system known as the Schlieren system may be employed. Additionally, while digital data stored on the element is achieved by a modulated light source, an image form may also be stored by exposing the sandwich to light in the form of said image. As a practical consideration, the thermoplastic layer and the photoconductive layer are both quite thin, in the order of fractions of milli-inches. Preferably, the materials are chosen so that $C_{TP}=C_{PC}$ but this is not an absolute essential. Basically, the materials and the dimensions thereof are chosen by experimentation so that the differences in electrostatic forces are set up under the conditions outlined above between the light and dark areas. The maximizing of the force gradients is effectively achieved by selection of materials where $C_{TP}=C_{PC}$. Thinness of layers is required since these forces vary inversely with the thickness of the layers.

Figure 5:
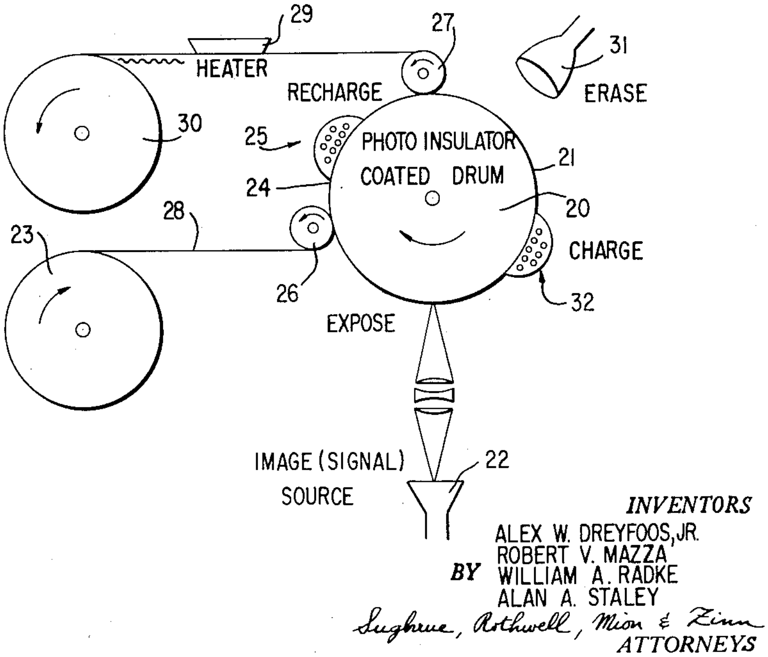
FIGURE 5 is a diagrammatic representation showing a drum embodiment of the present invention.

In FIGURE 5, the drum 20 has mounted on the periphery thereof a photoconductive layer 21. Illustration of the functioning of this drum embodiment is given according to Scheme B. The image source, such as CRT22, stores an image on the layer 21 as the drum rotates. A supply reel 23 of thermoplastic material is provided. It feeds a layer of thermoplastic material 28 to form a sandwich 24 with the exposed layer 21. The recharge station 25 performs the recharge function. The guide rolls 26 and 27 keep the layers together to form the rotating sandwich 24. After recharge, the layer 28 is removed from the drum as shown and passes to the heat station including the heater 29. This results in the ripple pattern on the thermoplastic layer 28. Layer 28 is then cooled to fix the pattern therein, and the take-up reel 30 stores the resultant layer 28 with image pattern thereon. The photoconductive layer passes to the erase station including means such as a lamp 31 wherein the original charge on layer 21 is removed. Said layer then passes to the charge station 32 where the uniform charge pattern is placed thereon. In this drum embodiment, it may be better to mount the thermoplastic layer to a base of Mylar or other high melting point, transparent dielectric base. This adds stability to the thermoplastic layer when it is removed from contact with the photoconductive layer. Effectively, the heating by heater 29 may be accomplished by dielectric heating of the Mylar base resulting in transfer of this heat from base to layer 28. Although it is possible to heat the layer 28, such plastics usually have a low loss factor resulting in inefficient heating. Incidentally, these latter comments pertain also to the later described Scheme C. In any event the base material, such as Mylar, should be chosen so as to have a sufficiently low resitivity for the charge pattern to leak when the resistivity of the layer 28 is lowered by heating to the erasure temperature.

What has been described are various embodiments of the present invention.

Other embodiments obvious from the teachings herein to those skilled in the art are contemplated to be within the spirit and scope of the following claims.

What is claimed is:

1. A method of storing information in a layer of thermoplastic material in the form of a ripple pattern on one surface thereof that comprises: providing a layer of photoconductive material one surface of which defines a boundary for engagement with another surface of said thermoplastic layer, forming a substantially uniform electrostatic charge on one of said surfaces, light modulating said photoconductive layer in accordance with said information to form on said boundary an electrostatic charge pattern corresponding to said modulation, forming in said one surface of said thermoplastic layer an electrostatic force pattern corresponding to said charge pattern, and heating said thermoplastic layer to form in said one surface thereof a ripple pattern corresponding to said electrostatic force pattern.

2. The method defined in claim 1 wherein said uniform charge is placed on said one surface of said photoconductive layer.

3. The method as defined in claim 1 further comprising cooling said thermoplastic layer to fix said ripple pattern therein.

4. The method defined in claim 3 further comprising reheating said thermoplastic layer above the melting point thereof to erase said ripple pattern.

5. A method of recording information on a thermoplastic material comprising forming a sandwich having a dielectric thermoplastic layer and a dielectric photoconductive layer, placing a uniform electrostatic charge on the outer surface of said thermoplastic layer to develop an electric potential between said outer surface of said thermoplastic layer and the outer surface of said photoconductive layer, exposing selected areas of said photoconductive layer to light in accordance with the information to be recorded, thereby reducing the resistance in said selected areas and decreasing the absolute value of the potential thereof, applying a recharge voltage across said sandwich so that the areas of said thermoplastic layer adjacent said selected areas are charged to a higher voltage than other areas of said thermoplastic layer, thereby establishing correspondingly higher electrostatic forces in said adjacent areas, heating said sandwich to the melting point of said thermoplastic material to form depressions therein in said outer surface in accordance with said information, and cooling said sandwich to fix said depressions in said thermoplastic layer.

6. The method defined in claim 5 wherein said thermoplastic layer is transparent and the photoconductive layer is exposed to light through said transparent thermoplastic layer.

7. The method defined in claim 6 wherein the exposure of said photoconductive layer to light and the application of said recharge voltage occur simultaneously.

8. A method of recording information on a dielectric thermoplastic material in the form of a ripple pattern comprising placing a uniform electrostatic charge on one surface of a layer of dielectric photoconductive material, bonding said one surface to a layer of thermoplastic material, light modulating said photoconductive layer to form a charge pattern on said one surface thereof in accordance with the information to be recorded, transferring said charge pattern to said thermoplastic layer to form a corresponding electrostatic force pattern therein, heating said thermoplastic layer to its melting point to form therein a ripple pattern corresponding to said force pattern, and cooling said thermoplastic layer to fix said ripple pattern.

9. A method of recording information on a web of dielectric thermoplastic material in the form of a ripple pattern therein comprising coating a rotatable drum with a dielectric photoconductive material, rotating said drum relative to an electrostatic charging device and a light source, placing a uniform charge on said coating from said device, exposing areas of said coating to light from said light source in accordance with the information to be recorded, thereby discharging said areas to form a charge pattern on said coating, placing said thermoplastic web into engagement with said coating and charge pattern, transferring said charge pattern to said thermoplastic web, removing said web from said coating, heating said web to its melting point to form depressions in the areas thereof which were in engagement with said discharged areas, thereby forming in said thermoplastic web a ripple pattern corresponding to said charge pattern, and cooling said web to fix said ripple pattern therein.

10. The method defined in claim 9 wherein said transferring step includes applying a recharge voltage across said web and coating while they are in engagement thereby placing a higher charge on areas of said web which are opposite said discharged areas than on other areas of said web.

11. A method of storing information in a layer of thermoplastic material in the form of depressed discrete areas therein comprising placing a substantially uniform electrostatic charge on one surface of a layer of photoconductive material, exposing selected discrete areas of said photoconductive layer to light in accordance with said information to alter said charge in said selected areas thereby forming a light modulated charge pattern on said one surface of said photoconductive layer, transferring said charge pattern to one surface of said thermoplastic layer to produce a corresponding electrostatic force pattern therein, heating said thermoplastic layer to its melting point to form depressions in discrete areas thereof corresponding to said selected discrete areas of said photoconductive layer, and cooling said thermoplastic layer to fix said depressions therein.

12. The method defined in claim 11 further comprising reheating said thermoplastic layer above its melting point to erase said depressions and said electrostatic force pattern therefrom.

No references cited.

Corrected Notice of Adverse Decision in Interference

In Interference No. 93,460 involving Patent No. 3,055,006, A. W. Dreyfoos, Jr., R. V. Mazza, W. A. Radke and A. A. Staley, HIGH DENSITY, ERASABLE OPTICAL IMAGE RECORDER, final judgment adverse to the patentees was rendered Sept. 17, 1964, as to claims 4 and 12.

This notice supersedes the Notice of Adverse Decision in Interference published in the Official Gazette of Dec. 22, 1964.

[*Official Gazette August 9, 1966.*]